US012348934B2

(12) United States Patent
Van Gerwen

(10) Patent No.: US 12,348,934 B2
(45) Date of Patent: *Jul. 1, 2025

(54) SOUND AWARENESS HEARING PROSTHESIS

(71) Applicant: Cochlear Limited, Macquarie University (AU)

(72) Inventor: Peter Bart Jos Van Gerwen, Keerbergen (BE)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,161

(22) Filed: Oct. 3, 2023

(65) Prior Publication Data

US 2024/0040323 A1 Feb. 1, 2024

Related U.S. Application Data

(60) Continuation of application No. 17/023,610, filed on Sep. 17, 2020, now Pat. No. 11,838,728, which is a continuation of application No. 16/008,328, filed on Jun. 14, 2018, now Pat. No. 10,805,742, which is a continuation of application No. 14/825,729, filed on Aug. 13, 2015, now Pat. No. 10,028,064, which is a (Continued)

(51) Int. Cl.
*H04R 25/00* (2006.01)

(52) U.S. Cl.
CPC ......... *H04R 25/554* (2013.01); *H04R 25/305* (2013.01); *H04R 25/43* (2013.01); *H04R 2225/41* (2013.01); *H04R 2225/61* (2013.01)

(58) Field of Classification Search
None
See application file for complete search history.

(56) References Cited

U.S. PATENT DOCUMENTS 6,810,289 B1 10/2004 Shaquer
7,529,587 B2 5/2009 Single (Continued)

FOREIGN PATENT DOCUMENTS

WO 2007144010 A1 12/2007

OTHER PUBLICATIONS

International Search Report and Written Opinion for PCT/IB2012/055890 mailed Mar. 28, 2013, 12 pgs.

*Primary Examiner* — Thaddeus B Cox
(74) *Attorney, Agent, or Firm* — Edell, Shapiro & Finnan, LLC

(57) ABSTRACT

The present application discloses a hearing prosthesis configured to alert a user of the presence of sound while operating in a sound awareness mode of operation. When a user of the hearing aid removes the external sound processor and microphone, traditionally, a hearing prosthesis does not produce any audio stimulus. Here, the systems and methods will alert a user to sounds in his or her environment when the external sound processor and microphone are decoupled from the internal components of the hearing prosthesis. In some embodiments, the hearing prosthesis may have an acoustic receiver that is implanted in the recipient. The implanted acoustic detector may be used to detect an aspect of a sound above a threshold level. The threshold may be chosen so the detected sound is a loud sound such as a fire alarm.

30 Claims, 6 Drawing Sheets

Related U.S. Application Data division of application No. 13/281,609, filed on Oct. 26, 2011, now Pat. No. 9,124,991.

(56) References Cited

U.S. PATENT DOCUMENTS

| | | | |
|---|---|---|---|
| 7,577,267 | B2 | 8/2009 | Barthel et al. |
| 7,612,655 | B2 | 11/2009 | Kolz et al. |
| 2002/0076071 | A1 | 6/2002 | Single |
| 2005/0078846 | A1 | 4/2005 | Single |
| 2007/0005118 | A1 | 1/2007 | Carter et al. |
| 2007/0027676 | A1 | 2/2007 | Chambers et al. |
| 2007/0100395 | A1 | 5/2007 | Ibrahim |
| 2007/0280495 | A1 | 12/2007 | Abolfathi |
| 2008/0111677 | A1 | 5/2008 | Kolz |
| 2008/0194953 | A1 | 8/2008 | Kerber |
| 2008/0240458 | A1 | 10/2008 | Goldstein |
| 2008/0285780 | A1 | 11/2008 | Aarts |
| 2009/0259277 | A1 | 10/2009 | Cornejo Cruz et al. |
| 2009/0292338 | A1 | 11/2009 | Gordon et al. |
| 2010/0317913 | A1 | 12/2010 | Conn et al. |
| 2011/0093039 | A1 | 4/2011 | Van Den Heuvel |
| 2011/0112607 | A1 | 5/2011 | Zierhofer |
| 2011/0137109 | A1* | 6/2011 | Zahnert ................ H04R 25/606 600/25 |
| 2012/0215055 | A1 | 8/2012 | Van Vlem et al. |

* cited by examiner

SOUND AWARENESS HEARING PROSTHESIS

RELATED APPLICATIONS

The present application is a continuation of U.S. patent application Ser. No. 17/023,610, filed Sep. 17, 2020, now U.S. Pat. No. 11,838,728, which is a continuation application of U.S. patent application Ser. No. 16/008,328, filed on Jun. 14, 2018, now U.S. Pat. No. 10,805,742, which is a continuation application of U.S. patent application Ser. No. 14/825,729, filed Aug. 13, 2015, now U.S. Pat. No. 10,028, 064, which is a divisional application of U.S. patent application Ser. No. 13/281,609 filed Oct. 26, 2011, now U.S. Pat. No. 9,124,991. The content of these applications is hereby incorporated by reference herein.

BACKGROUND

Various types of hearing prostheses may provide persons with different types of hearing loss with the ability to perceive sound. Hearing loss may be conductive, sensorineural, or some combination of both conductive and sensorineural hearing loss. Conductive hearing loss typically results from a dysfunction in any of the mechanisms that ordinarily conduct sound waves through the outer ear, the eardrum, or the bones of the middle ear. Sensorineural hearing loss typically results from a dysfunction in the inner ear, including the cochlea, where sound vibrations are converted into neural signals, or any other part of the ear, auditory nerve, or brain that may process the neural signals.

Persons with some forms of conductive hearing loss may benefit from hearing prostheses, such as acoustic hearing aids or vibration-based hearing aids. An acoustic hearing aid typically includes a small microphone to detect sound, an amplifier to amplify certain portions of the detected sound, and a small speaker to transmit the amplified sounds into the person's ear. Vibration-based hearing aids typically include a small microphone to detect sound, and a vibration mechanism to apply vibrations corresponding to the detected sound to a person's bone, thereby causing vibrations in the person's inner ear, thus bypassing the person's auditory canal and middle ear. Vibration-based hearing aids may include bone anchored hearing aids, direct acoustic cochlear stimulation devices, or other vibration-based devices. A bone anchored hearing aid typically utilizes a surgically-implanted mechanism to transmit sound via direct vibrations of the skull. Similarly, a direct acoustic cochlear stimulation device typically utilizes a surgically-implanted mechanism to transmit sound via vibrations corresponding to sound waves to generate fluid motion in a person's inner ear. Other non-surgical vibration-based hearing aids may use similar vibration mechanisms to transmit sound via direct vibration of teeth or other cranial or facial bones.

Persons with certain forms of sensorineural hearing loss may benefit from cochlear implants. Cochlear implants provide a person having sensorineural hearing loss with the ability to perceive sound by stimulating the person's auditory nerve via an array of electrodes implanted in the person's cochlea. An external component of the cochlear implant detects sound waves, which are converted into a series of electrical stimulation signals delivered to the implant recipient's auditory nerve via the array of electrodes. Stimulating the auditory nerve in this manner may enable the cochlear implant recipient's brain to perceive a sound.

SUMMARY

The present application discloses systems and methods for use with a hearing prosthesis configured to alert a user of the presence of sound. The present systems and methods may correspond to a secondary mode of operation for the hearing prosthesis. The secondary mode of operation may be a sound awareness operation mode. In one embodiment, the hearing prosthesis may include an external portion and an internal (or implanted) portion. Traditionally, the external portion of a hearing prosthesis includes a sound processor and microphone, and the internal (or implanted) portion includes a receiver and an output configured to apply stimulation signals to the recipient based on sounds detected by the microphone and processed by the sound processor of the external portion.

In operation, when the prosthesis recipient removes the external portion of the hearing prosthesis containing the sound processor and microphone, a traditional hearing prosthesis is unable to receive external sounds or provide a corresponding stimulus to the recipient. As a result, the prosthesis recipient is unable to hear any sounds while the external portion removed, incorrectly attached to the recipient, malfunctioning, or otherwise unable to send signals from the sound processor in the external portion to be applied to recipient via the output located in the internal (or implanted) portion of the prosthesis. In certain cases, being unable to hear certain sounds may be very dangerous or life threatening, such as, for example, if a fire alarm goes off while the recipient is engaged in activities where removal of the external portion is required or desirable, e.g., showering or sleeping.

Embodiments of the disclosed systems and method overcome or at least ameliorate the above-described shortcomings of traditional hearing prostheses. In some embodiments, the internal (or implanted) portion of the hearing prosthesis has its own sound processor and an acoustic detector, such as a microphone. The implanted acoustic detector may be used to detect a sound that is above a threshold detection level. The threshold detection level may be chosen so the detected sound is a loud sound, such as a siren, a burglar alarm, a train or car horn, a gunshot, or specific emergency sounds. For example, the threshold detection level may be chosen based upon the volume of a fire alarm. The fire alarm may have an average volume of approximately 90 decibels sound pressure level (dB SPL) in a building. Therefore, if the threshold detection level is set slightly lower, for example 85 dB SPL, the average sound pressure created by the fire alarm would exceed the threshold detection level value. When the threshold detection level is exceeded by the fire alarm, the prosthesis can alert the prosthesis recipient to the fire alarm, even if the prosthesis recipient is not wearing the external portion of the prosthesis with the main (or primary) sound processor and microphone.

In some embodiments, the implanted acoustic detector may be used to detect a signature of the detected sound. This signature may include components of the sound such as modulation index, frequency patterns, signal to noise estimations, etc. Thus, the implanted acoustic detector and sound processor detects an aspect of a received signal and compare the aspect to a threshold specific for each respective aspect.

Additionally, the disclosed embodiments may be advantageous in situations where a battery in the external portion of the hearing prosthesis has run out of energy. In a traditional hearing prosthesis, once the battery in the external portion runs out of energy, the prosthesis may no longer be able to generate and apply stimulation signals to the recipient. However, a prosthesis according to the disclosed embodiments having an internal portion with a secondary sound processor and acoustic detector, and configured to operate in the sound awareness mode of operation disclosed herein would enable a recipient to have basic sound perception even if the battery in the external unit ran out of power or otherwise failed.

Furthermore, in some use cases, an external portion of a hearing prosthesis may be incorrectly coupled to the internal portion of the prosthesis. The external portion may be working correctly, but the signal may not be properly received by the internal portion. In this use case, the sound awareness mode of operation gives the hearing prosthesis recipient some basic hearing functionality.

The sound perceived in the sound awareness mode of operation may be different from the sound perceived in the primary mode of operation. This may enable a recipient to know that the external unit is malfunctioning (or not present). Additionally, the methods and systems presented herein are not limited to any particular type of hearing prosthesis. For example, a cochlear implant may revert to the sound awareness mode when its external portion has been detached, is out of power, or is otherwise malfunctioning. Similarly, a traditional acoustic hearing aid may revert to the sound awareness operation mode when it is close to running out of battery power to conserve energy. Other types of hearing prostheses could similarly benefit from operating in a sound awareness mode of operation as described herein.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. Certain aspects of the disclosed systems and methods can be arranged and combined in a wide variety of different configurations, all of which are contemplated herein.

For illustration purposes, some features and functions are described with respect to cochlear implants. However, many features and functions may be equally applicable to other types of hearing prostheses. Certain aspects of the disclosed systems, methods, and articles of manufacture could be applicable to any type of hearing prosthesis now known or later developed.

1. An Example Cochlear Implant

Figure 1A:
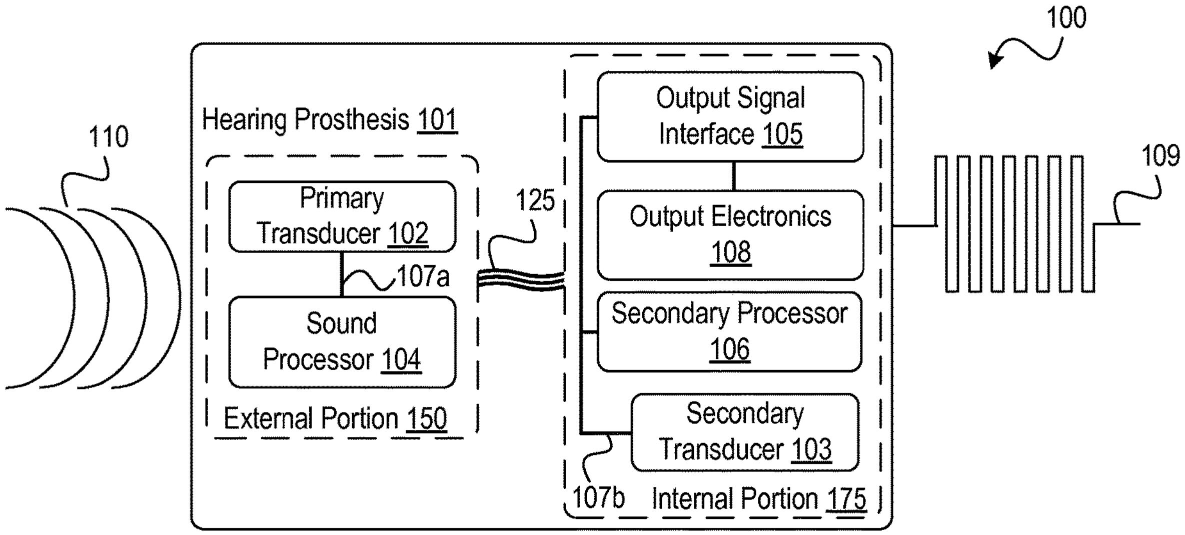
FIG. 1A shows one example of a hearing prosthesis.

FIG. 1A shows one example 100 of a hearing prosthesis 101 configured according to some embodiments of the disclosed systems, methods, and articles of manufacture. The hearing prosthesis 101 may be a cochlear implant, an acoustic hearing aid, a bone anchored hearing aid or other vibration-based hearing prosthesis, a direct acoustic stimulation device, an auditory brain stem implant, or any other type of hearing prosthesis configured to receive and process at least one signal from an audio transducer of the prosthesis.

The hearing prosthesis 101 includes a primary transducer 102, a secondary transducer 103, a sound processor 104, an output signal interface 105, and a secondary processor 106, all of which are connected directly or indirectly via circuitry 107*a* and 107*b*. In other embodiments, the hearing prosthesis 101 may have additional or fewer components than the prosthesis shown in FIG. 1. Additionally, the components may be arranged differently than shown in FIG. 1. For example, depending on the type and design of the hearing prosthesis, the illustrated components may be enclosed within a single operational unit or distributed across multiple operational units (e.g., an external unit, an internal unit, etc.). Similarly, in some embodiments, the hearing prosthesis 101 may additionally include one or more processors (not shown) configured to determine various settings for its sound processor 104.

In embodiments where the hearing prosthesis 101 is a cochlear implant, the hearing prosthesis comprises an external portion 150 worn outside the body and an internal portion 103 worn inside the body. The external portion 150 is coupled to the internal portion 175 via an inductive coupling pathway 125. The external portion 120 houses a primary transducer 102 and a sound processor 104. The primary transducer 102 receives acoustic signals 110, and the sound processor 104 analyzes and encodes the acoustic signals 110 into a group of electrical stimulation signals 109 for application to an implant recipient's cochlea via an output signal interface 105 communicatively connected output electronics 108. For a cochlear implant, the output electronics 108 are an array of electrodes. Individual sets of electrodes in the array of electrodes are grouped into stimulation channels. Each stimulation channel has at least one working electrode (current source) and at least one reference electrode (current sink). In operation, the cochlear implant applies electrical stimulation signals to a recipient's cochlea via the stimulation channels. It is these stimulation signals that cause the recipient to experience sound sensations corresponding to the sound waves received by the primary transducer 102 and encoded by the processor 104.

In some embodiments, the primary transducer 102 may be not present or not functioning. In this operating condition, the secondary transducer 103 receives acoustic signals 110, and the secondary sound processor 106 analyzes and encodes the acoustic signals 110 into a group of electrical stimulation signals 109 for application to an implant recipient's cochlea via an output signal interface 105 communicatively connected to the array of electrodes.

Figure 1B:
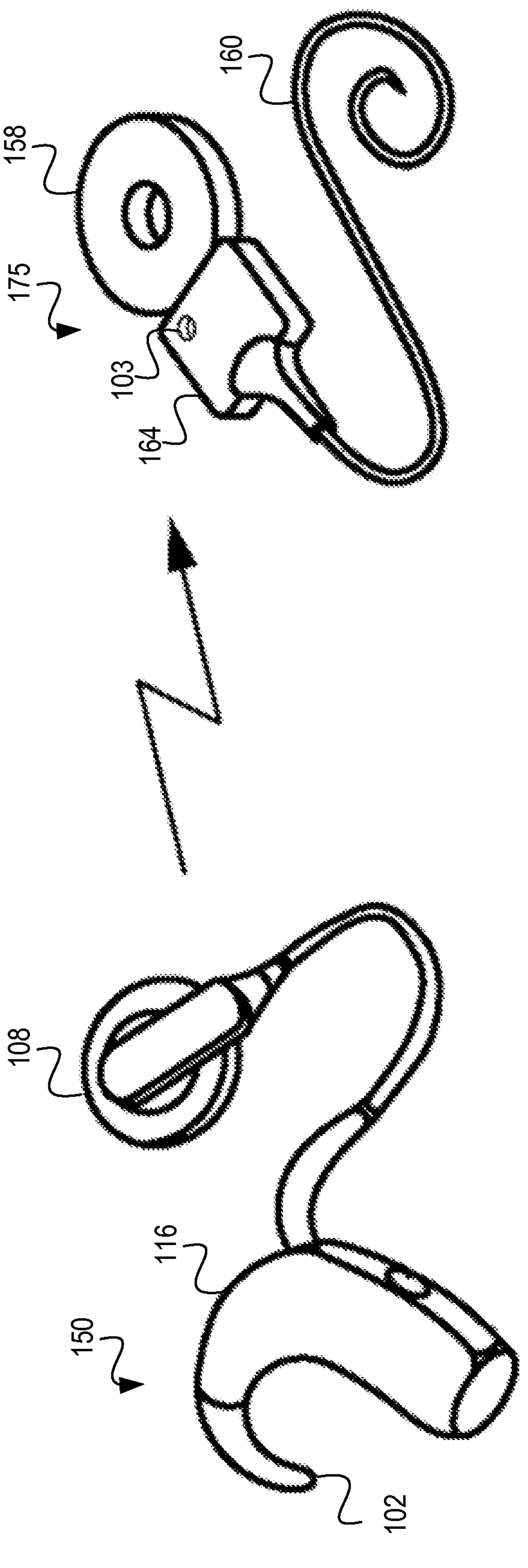
FIG. 1B shows an example of an external portion of a cochlear implant coupled to the internal portion of the cochlear implant.

FIG. 1B shows an example of an external portion 150 of a cochlear implant coupled to the internal portion 175 of the cochlear implant. The external portion 150 may be directly attached to the body of a recipient and the internal portion 175 is implanted in the recipient. The external portion 150 typically comprises a housing 116 which has incorporated a primary transducer 102 for detecting sound, a sound processing unit (104 of FIGS. 1A and 2), an external coil 108 including a radio frequency modulator and a coil driver, and a power source (not shown). An external coil 108 is connected with a transmitter unit and the housing 116 by a wire. The housing 116 may be shaped so that it can be worn and held behind the ear. The speech processing unit in the housing 116 processes the output of the transducer 102 and may generate coded signals which are provided to the external coil 108 via the modulator and the coil driver (not shown).

The internal portion 175 comprises a receiver unit (302 of FIG. 3), a stimulator unit (304 of FIG. 3), an external portion sensor (not shown), a battery (not shown), a secondary processor (106 of FIGS. 1A and 3) and a secondary transducer 103 which are placed in a housing 164. Attached to the housing 164 are an internal coil 158 and an electrode assembly 160 which can be inserted in the cochlea. Magnets (not shown) may be secured to the internal (receiving) coil 158 and the external (transmitting) coil 108 so that the external coil 108 can be positioned and secured via the magnets outside the recipient's head aligned with the implanted internal coil 158 inside the recipient's head. The internal coil 158 receives power and data from the external coil 108. The internal portion 175 has a power source, such as a battery or capacitor, to provide energy to the electronic components housed within the internal portion 175. The external portion 150 may be able to inductively charge the power source within the internal portion 175. In some embodiments, a power source that is part of the external portion 150 is the primary power source for the hearing prosthesis. In this embodiment, the power source within the internal portion 175 may only be used as a backup source of power. The battery in the internal portion 175 is used as a backup power source when either the external portion 150 runs out of power or when the external portion 150 is decoupled from the internal portion 175. A cable of the electrode assembly 160 extends from the implanted housing 164 to the cochlea and terminates in the array of electrodes.

Transmitted signals received from the internal coil 158 are processed by the receiver unit in the housing 164 and are provided to the stimulator unit in the housing 164. Additionally, signals may be received by the secondary transducer 103 and processed with the secondary processor 106. The stimulator unit generates signals which are applied by the array of electrodes to the cochlea. The secondary transducer 103 may be located completely within the housing 164 or it may be partially exposed through the housing.

In some embodiments, the secondary transducer 103 is a microphone. Unlike primary transducer 102, the secondary transducer 103 may not be as high quality of transducer. In many embodiments, it is desirable for the primary transducer 102 to have a frequency response that covers at least the frequency range of human hearing, preferably an even larger range. This would enable the hearing prosthesis to detect all human speech. However, the secondary transducer 103 may be of a lower cost than the primary transducer 102. For example, the frequency response of the secondary transducer 103 may be more narrow than the frequency response of the primary transducer 102. Additionally, the secondary transducer 103 may have lower acoustic fidelity than the primary transducer 102. The frequency response of the primary transducer 102 is typically desired to be close to flat across the desired frequency range. The frequency response of the secondary transducer 103 may not be flat as the secondary transducer 103 may be designed to detect the presence of sound, rather than the accurate capture of acoustic information. Furthermore, the secondary transducer 103 may be mounted directly on the printed circuit board of the internal portion 175 of the hearing prosthesis. The secondary transducer 103 may be located within the same housing as the secondary sound processor 106.

The secondary transducer 103 is configured to detect sound and generate an audio signal, typically an analog audio signal, representative of the detected sound. In the example embodiment shown in FIG. 1B, the secondary transducer 103 is a microphone; however, the secondary transducer 103 may be many other types of audio transducer. For example, the secondary transducer may be a microphone, vibration sensor, accelerometer, piezoelectric sensor, or other transducer.

The external coil 108 may be held in place and aligned with the implanted internal coil via the noted magnets. In one embodiment, the external coil 108 may be configured to transmit electrical signals to the internal coil via a radio frequency (RF) link. In some embodiments, the external coil 108 may be configured to transmit electrical signals to the internal coil via a magnetic (or inductive) coupling.

Figure 2:
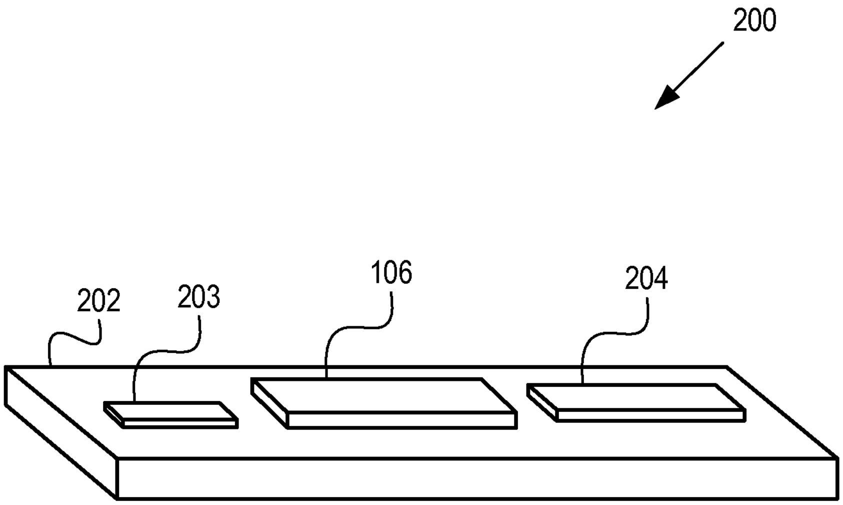
FIG. 2 is an example internal portion of a hearing prosthesis.
Figure 3:
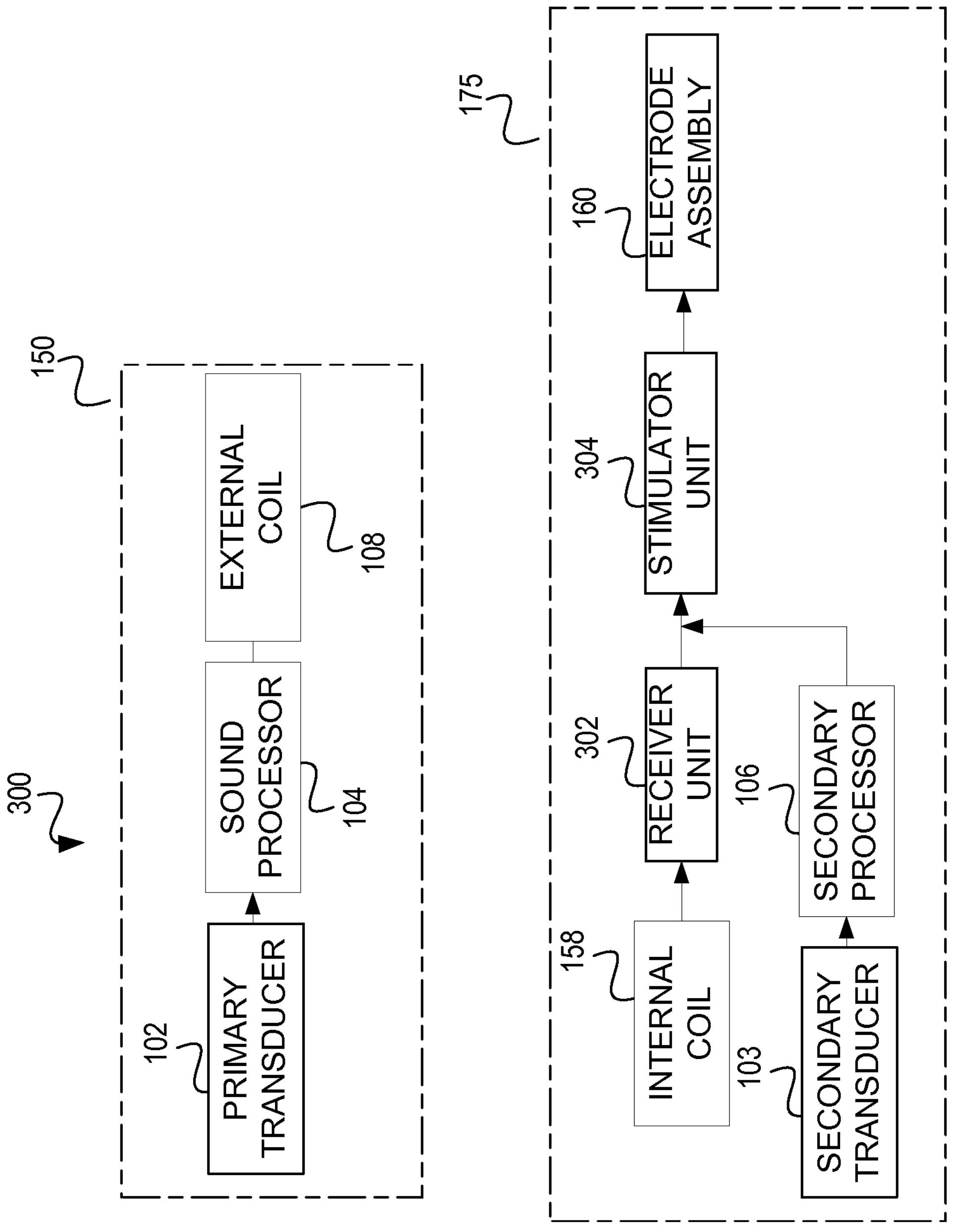
FIG. 3 is a block diagram of a cochlear implant.

FIG. 2 is an example internal portion of a hearing prosthesis. In some embodiments, the internal portion of the hearing prosthesis 200 may comprise a printed circuit board (PCB) 202. The PCB 202 may be mounted within a housing and implanted within the body of a recipient. The PCB may have various component mounted on its surface. In the example shown in FIG. 2, the PCB 202 has a microphone 203, a secondary audio processor 106, and output circuitry 204 mounted on its surface. The output circuitry 204 may be similar to the output signal interface 105 of FIG. 1A or the stimulator unit 304 of FIG. 3. The microphone 203 may be mounted on PCB 202 along with all the other components of the internal portion of the hearing prosthesis, rather than in a separate part of a monolithic enclosure. Other components may be added or removed as necessary; FIG. 3 presents one example layout. In one embodiment, the microphone 203 is an inexpensive surface mounted microphone on the PCB 202. The surface mounted microphone may be a low cost PCB mount microphone that is not necessarily designed to be implanted. An implanted microphone would still be able to capture loud sounds from outside the recipient's body.

An advantage to placing the microphone 203 on the PCB 202 is the small space requirement for the microphone. Commercially available microphones may have a footprint of four square millimeters and a special volume of four millimeters cubed. Additionally, by placing the microphone 203 on the PCB 202, fabrication, and connections to other components could be made more easily. One type of microphone that may be used is a small silicone microphone, e.g. the Digital Silicon Microphone TC100E of Pulse, Denmark. This microphone is only 2.6 mm×1.6 mm×0.9 mm and could be put on the printed circuit board inside an existing casing. The Digital Silicon Microphone TC100E is not engineered to be implanted within the human body, but when placed on the PCB and mounted in a housing, it would perform sufficiently for the methods presented herein. The microphone may be a silicon microphone, microelectromechanical system (MEMS) microphone, chip microphone, balanced armature microphone, or other type of small microphone. In other alternative embodiments, the microphone could be a bigger microphone on the printed circuit board. Additionally, the microphone could be not on the printed circuit board, but connected to the casing of the implant, or any other place around the implant. In further embodiments, the casing could be adapted; with a membrane port to increase sensitivity; and/or the microphone could be implanted but outside the housing.

FIG. 3 is a block diagram of a cochlear implant for use with some embodiments described herein. Many of the blocks of cochlear implant 300 have been described with respect to FIG. 1A and FIG. 1B. The cochlear implant 300 may have at least two acoustic inputs, a primary transducer 102 and a secondary transducer 103. In many embodiments, the primary transducer 102 is a microphone. However, the primary transducer 102 may be another type of transducer, e.g., a vibration sensor, an accelerometer, or a piezoelectric sensor. Additionally, the transducers 102 and 103 may be coupled to sound processors 104 or secondary processor 106.

The processors 104 and 106 may be used to filter undesirable sounds. For example, the sound processor 104 or the secondary processor 106 may be configured to remove sounds generated by the recipient, such as breathing, chewing, speaking, or heartbeats. The secondary transducer 103 can also be configured to detect sounds produced within the body. The sounds produced within the body may have a higher amplitude than sounds produced outside the body. These internally produced sounds may cause an undesirable output if they are not filtered.

The external coil 108 sends a signal from the external portion 150 to the internal coil 158 of the internal portion 175 of the cochlear implant. The internal coil 158 may be coupled to a receiver unit. The receiver unit converts the signal from the internal coil to a signal to provide to the stimulator unit 304. The internal portion may also contain a secondary transducer 103 coupled to a secondary processor 106. The secondary processor 106 may be coupled to the stimulator unit 304. The output of the stimulator unit 304 is coupled to an electrode assembly 160. Furthermore, the audio processing system may have a sensor (not shown) to determine the presence of the external portion of the hearing prosthesis.

The sensor used to determine the presence of the external portion of the hearing prosthesis might vary depending on the hardware of the internal portion of the hearing prosthesis. In some embodiments, there may be more than one sensor. In other embodiments, there is only one sensor. For example, the internal portion 175 may have a magnetic sensor. The magnetic sensor detects the presence of a magnet in the external portion when the external portion is placed adjacent to a patient's head.

Additional embodiments may have a sensor that detects a signal that is transmitted from the external portion to the internal portion. In some embodiments, the detected signal is a "keep alive" signal the external portion 150 sends to the internal portion 175. The "keep alive" signal is used to communicate the status of the hearing prosthesis. For example, during operation of the hearing prosthesis, a "keep alive" signal is transmitted to ensure the internal portion 175 stays powered on. If no "keep alive" is received for a predetermined period of time, the internal portion 175 may go in to sound awareness mode. In other embodiments, the sensor may sense a signal from the external portion 150 that contains acoustic information. If no signal with audio data is received for a predetermined period of time, the internal portion 175 may go in to sound awareness mode.

Additionally, the sound processor 104 and secondary processor 106 may analyze and encode the acoustic signals. The encoded signal from sound processor 104 may be sent to an external coil 108 for transmission to the internal portion 175. The stimulator unit 304 applies stimulation signals based on the encoded signals to the recipient via in the array of electrodes.

In operation, a hearing prosthesis with two modes of operation, e.g., a "normal mode" and a "sound awareness" mode can be configured to switch between the two modes based on the absence of a signal from the first processor 104. When operating in normal mode, the hearing prosthesis may detect an audio signal with a first transducer 102 and process the audio signal with an audio processor 104. This processed signal may then be transmitted to a second portion of the hearing prosthesis 175 located within the body of the recipient. In the second internal portion of the hearing prosthesis, the processed signal may be transformed into an output signal 109. The output signal 109 may be a representation of the detected audio signal.

If the internal portion 175 of the hearing prosthesis does not detect a signal transmitted from the external portion 150 of the prosthesis (or if the internal portion 175 alternatively detects a mode-switching signal from the external portion), the hearing prosthesis may switch to the sound awareness mode. In the sound awareness mode, the hearing prosthesis detects an audio signal with a second transducer 103 located within the internal portion 175 of the hearing prosthesis and compare the amplitude of the detected audio signal with a threshold detection level. If the threshold detection level is exceeded, then the internal portion 175 of the hearing prosthesis generates output signal 109. In some embodiments, the output signal is a representation of the detected audio signal. In other embodiments, the output signal is not a representation of the detected audio signal, but an indication that there is a detected audio signal that exceeded the threshold detection level. In these embodiments, the output signal 109 may be a series of beeps, a tone, or another similar type of indication or alert.

Two parameters related to cochlear implants (and other hearing prostheses) are the threshold output level and the comfort level. Threshold output levels and comfort levels may vary from recipient to recipient and from stimulation channel to stimulation channel. The threshold output levels and the comfort levels determine in part how well the recipient hears and understands detected speech and/or sound.

The threshold output level may correspond to the level where the recipient first identifies sound sensation. For a cochlear implant, the threshold output level is the lowest level of stimulation current that evokes the sensation of sound for a given channel. An audiologist or clinician typically determines the threshold output level by playing a stimulus to a recipient through the hearing prosthesis, while iteratively increasing or decreasing the intensity of the stimulus. The intensity of the sound is iteratively increased or decreased, passing the recipient's hearing threshold output level twice. The audiologist or clinician observes the response of the recipient, such as, for example, indicating gestures in the case of adults, or observing behavioral reactions in the case of children. The threshold output level will correspond to the lowest amplitude stimulus the recipient can detect.

The comfort level sets the maximal allowable stimulation level for each electrode channel. For a cochlear implant, the comfort level corresponds to the maximum stimulation current level that feels comfortable to the recipient. In setting and establishing the comfort levels, it may be usual for an audiologist or clinician to instruct the recipient to indicate a level that is "as loud as would be comfortable for long periods" while slowly increasing the stimulation for a particular channel. The comfort levels may affect how speech sounds to the recipient more than the threshold output levels because most of the acoustic speech signal may generally be mapped onto approximately the top 20% of the threshold output level and comfort level range.

Although the terminology may be device-specific, the general purpose of threshold output levels and comfort levels is to configure the dynamic operating range of the cochlear implant by defining the lowest stimulation levels (threshold output levels) and the highest acceptable stimulation levels (comfort levels) for each stimulation channel.

In some embodiments, the output levels may be adjusted based on the operation mode of the hearing prosthesis. For example, when the hearing prosthesis is operating in sound awareness mode it may be desirable to increase the output level for one or more channels. By increasing the overall output level when operating in sound awareness mode, the hearing prosthesis increases the volume of the at least some the signals produced by the hearing prosthesis. This helps improve the recipient's ability to hear the audio associated with the acoustic signal.

For example, when the cochlear implant increases the threshold output level for one or more channels in connection with switching from normal operation mode to sound awareness mode, the cochlear implant will increase the minimum amplitude of the electrical stimulation signals applied to the cochlea via the electrode array. Similarly, in an acoustic hearing aid (where the output is a speaker), the increasing the threshold output level corresponds to an increase in the sound pressure level (dB SPL) of the speaker output. In the industry, it is common to refer to the electrical output of the electrode array in a cochlear implant as having an output with an associated dB SPL. The dB SPL output of electrode array is a mapping of an incident sound pressure level to an electrical output of the electrode array. Likewise, in a vibration-based hearing prosthesis, the increasing the threshold output level corresponds to an increase in the amplitude of the vibrations that the hearing prosthesis applies to the prosthesis recipient's cranial or facial bones.

The measurement of dB SPL is a measurement relative to a reference sound pressure in air of 20 μPa root mean squared (RMS), which is typically considered the threshold of human hearing. An audiologist or clinician may program the stimulator unit 304 with the correlation of the output voltage and current to an associated SPL produced when the audio prosthesis is used in situ.

The output of the stimulator unit 304 is connected to electrode assembly 160 of the cochlear implant. But as described herein, the output circuitry may take different forms depending on the configuration of the hearing prosthesis 101. For example, the output circuitry 105 may be associated with an acoustic transducer or speaker when the prosthesis is an acoustic hearing aid. Similarly, the output circuitry 105 may be associated with a bone conduction driver when the prosthesis is a vibration-based hearing prosthesis. Also, the output circuitry 105 may be associated with an array of electrodes implanted in an implant recipient's cochlea when the prosthesis is a cochlear implant.

Although the elements of the cochlear implant 300 are shown connected in a specific order, other connections are possible as well. Some elements may be added or omitted depending on the prosthesis configuration and the specific needs of the recipient.

2. Sound Awareness System Overview

Figure 4:
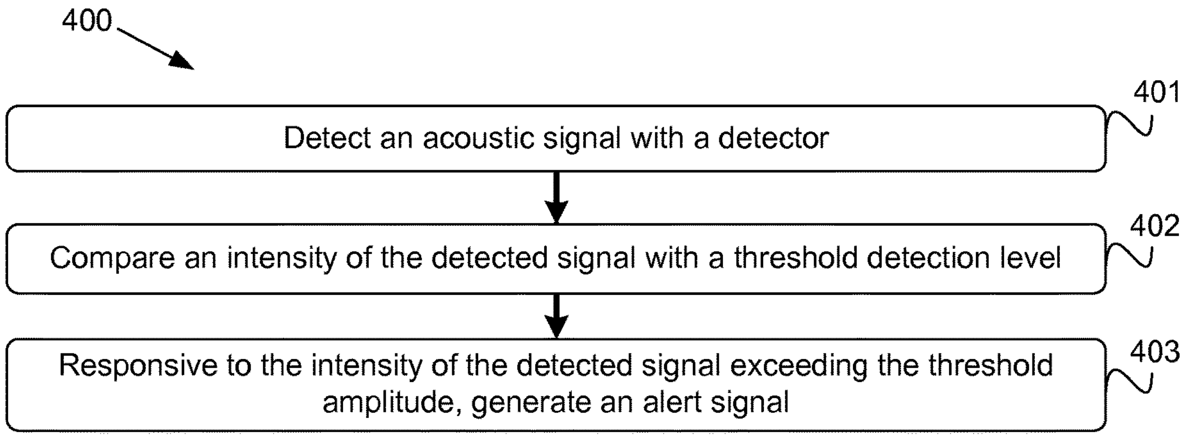
FIG. 4 is a flow diagram of one embodiment of the sound awareness method.

FIG. 4 is a flow diagram of one embodiment of the sound awareness method presented herein. Some examples of method 400 may be performed by the example cochlear implant 300 shown in FIG. 3 or other hearing prostheses. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Method 400 may begin at block 401, where the prosthesis detects a signal associated with an acoustic signal with an acoustic detector, i.e., a secondary transducer. In some embodiments, the acoustic detector may be located within the body of a recipient of the hearing prosthesis. For example, the acoustic detector may be inside the housing of the internal portion of a cochlear implant device. When the acoustic detector is located within the body of a recipient, an acoustic signal has to propagate through the recipient's body before it is detected. Additionally, the acoustic detector may be located within a housing that has been implanted within the prosthesis recipient. The housing would also attenuate the acoustic signal.

In many embodiments, the detected signal is an acoustic wave. In other embodiments, the detected signal may be a vibration associated with an acoustic signal or movement associated with an acoustic signal. For example, the acoustic wave associated with a loud sound may have an amplitude large enough for a vibration sensor to detect. The vibration sensor may be configured to detect vibrations with a frequency within a range of frequencies audible to humans. Thus, the sound can produce a vibration and be detected by the vibration sensor.

The acoustic detector may vary depending on the type of signal to be detected. If an acoustic wave is being detected, the detector may be a microphone. If the signal is a vibration or movement, a different type of detector, such as an accelerometer may be used. A vibration detector may be able to detect a compression wave or movement associated with an acoustic signal.

Additionally, a detector located inside a recipient's body would detect internal sounds produced inside the body of the recipient. For example, blood flowing, heart beating, breathing, and chewing all produce sounds within a recipient's body. In some embodiments, it may be desirable for the detector to be coupled to a filter to remove internal sounds generated inside of the recipient. If the internal sounds of the recipient are not removed from the output of the secondary transducer, then the system may undesirably create and apply stimulation signals to the recipient's cochlea based on the internal sounds.

Block 401 may be followed by block 402, where an amplitude of a signal detected with the acoustic detector is compared with a threshold detection level value. The amplitude may be set at a level corresponding to sounds above a threshold detection level. Block 402 can also be a more intelligent block that is not purely based on the threshold detection level value, but on the whole signature of the detected sound. This signature may include components of the sound such as modulation index, frequency patterns, signal to noise estimations, etc. Thus, the Block 304 detects an aspect of a received signal and compare the aspect to a threshold specific for each respective aspect. The disclosure focuses on threshold detection, however other aspects of the received signal may be used to trigger sound awareness mode as well.

The threshold detection level may also be set based on the location of the acoustic detector. For example, the acoustic detector may be mounted inside the internal portion of a cochlear implant. The recipient's body tissue between the implant and the external world will attenuate the acoustic signal before it reaches the acoustic detector. Additionally, the thickness of the implant housing can increase the attenuation of acoustic signals. Chart 1 shows four example cochlear implant housing thicknesses and the associated attenuation after the implant is placed inside the recipient. To determine the intensity of an acoustic signal, the system should be configured to compensate for the attenuation caused by the recipient's body tissue and the implant housing. For example, Chart 1 shows the apparent volume of a 95 dB fire alarm as measured by an acoustic detector located in a housing implanted in a recipient when accounting for the attenuation of the recipient's body tissue and different housing thicknesses.

Chart 1

| Housing Thickness (mm) | Housing and Human Attenuation (dB SPL) | Example Fire Alarm Volume at Prosthesis (dB SPL) |
|---|---|---|
| 0.7 | 72 | 95 − 72 = 23 |
| 0.9 | 79 | 95 − 79 = 16 |
| 1.1 | 83 | 95 − 83 = 12 |
| 1.3 | 88 | 95 − 88 = 7 |

Because the attenuation caused by the thickness of the housing and the recipient's body tissue can vary with the location of the prosthesis, the threshold detection level may need to be adjusted based on the specific recipient. For example, a 95 dB SPL fire alarm would be measured as having a 23 dB SPL if the housing was 0.7 mm thick because of the 72 dB of attenuation caused by the recipient's body tissue and the housing. However, if the housing was 1.3 mm thick, a 95 dB SPL fire alarm would be measured as having a 7 dB SPL because of the 88 dB attenuation caused by the recipient's body tissue and the housing. Thus, when the housing is 1.3 mm thick, a threshold detection level that triggers when a 4 dB SPL signal is detected may be desirable and when the housing is 0.7 mm, a threshold detection level that triggers when a 20 dB SPL signal is detected may be desirable.

The threshold detection level may be set slightly below the estimated volume of a sound to be detected when attenuation is included. In the examples presented above, the threshold detection level is set 3 dB below the approximate volume of the fire alarm as measured at the detector. Therefore, some sounds slightly quieter than the alarm may be detected, but a signal as loud as the fire alarm should be reliably detected.

In some embodiments, the hearing prosthesis may additionally have a calibration mode. In the calibration mode, the threshold detection level could be set. A recipient could be exposed to a calibration sound in a controlled environment. The calibration sound could be controlled and kept at the volume corresponding to the threshold detection level. After calibration, any noise equally as loud or louder than the calibration sound would trigger the threshold detection level. Additionally, the calibration mode could also be used to identify internal noises from the inside of the recipient's body. For example, a recipient could set the hearing prosthesis to calibration mode and perform several tasks, such as chew, breathe loudly, and exercise, that create sounds within the recipient's body. This would allow the hearing prosthesis to characterize sounds associated with the inside of the human body and filter them out.

The calibration mode may also allow a prosthesis recipient to adjust the output level and the comfort level associated with signals generated by the hearing prosthesis. For example, a recipient may want a sound produced when operating in sound awareness mode to have a higher associated signal level than a sound in normal operation mode. Therefore, during calibration, the output level for the sound awareness mode is increased from the threshold output level in normal operation by some amount desired by the recipient.

Additionally, the calibration mode may allow a duration to be controlled. In some embodiments, it may be desirable for the trigger to require a sound to exceed the threshold intensity as well as a threshold duration. For example, a falling book may make a noise the same intensity as a fire alarm, but have a shorter duration. Thus, during calibration, a duration parameter may be set as well. An example duration parameter may be one half of a second. This duration would allow the sound awareness mode to ignore a transient impulse-type sound, but still alert a user of a loud sound with a long duration. In some embodiments, more than one trigger may be defined. For example, all sounds above 105 dB SPL may trigger sound awareness mode and a sound above 90 dB SPL with a duration of over 1 second may trigger sound awareness mode.

Block 304 may be followed by block 304, where an alert signal is generated in response to the detected signal exceeding a threshold detection level. The alert informs a recipient of the presence of the acoustic signal. In some embodiments, the alert signal may be a tone. For example, when the threshold detection level is exceeded, the recipient may hear a tone that sounds like a beep. In some embodiments, the alert signal changes based on how much the signal exceeds the threshold detection level. If a sound is slightly louder than the threshold detection level, the alert signal may be a tone may be played as a single beep. If the threshold detection level is exceeded by a larger amount, the alert signal may be a tone played as two beeps. The number of beeps may increase as a function of the how much the acoustic signal exceeds the threshold detection level.

In other embodiments, the alert signal may vary. The alert signal may be a human voice, the alert signal may be a simulated noise, or the alert signal may be a reproduction of the detected acoustic signal. In some embodiments, the hearing prosthesis detects the type of sound that created the acoustic signal and vary the alert signal based on the detected acoustic signal. For example, if a fire alarm is detected, the alert signal may be a simulated human voice saying, "warning fire." If the detected sound is a person talking or an unknown source, the alert signal may be a series of beeps.

In some embodiments, the secondary signal processor 106 may measure signature of the detected sound. This signature may include components of the sound such as modulation index, frequency patterns, signal to noise estimations, etc. Based on the signature, the source of the sound may be identified. For example, a specific fire alarm may make a sound that has specific frequency components in its signature. The identified signature may trigger a specific alert sound to be played.

The alert signal may alert the recipient of the loud noise and that it may be desirable to attach the external portion of the hearing prosthesis. In some embodiments, the alert signal informs a recipient that the external portion of the hearing prosthesis has failed, and that the prosthesis is operating in a sound awareness mode.

In some embodiments, the prosthesis recipient may customize the alert signal. For example, the recipient may select the sound produced by the prosthesis when the threshold detection level is exceeded. Additionally, the recipient may choose the associated signal level of the alert signal. As a personal preference, some recipients may desire a louder or softer alert signal.

Figure 5:
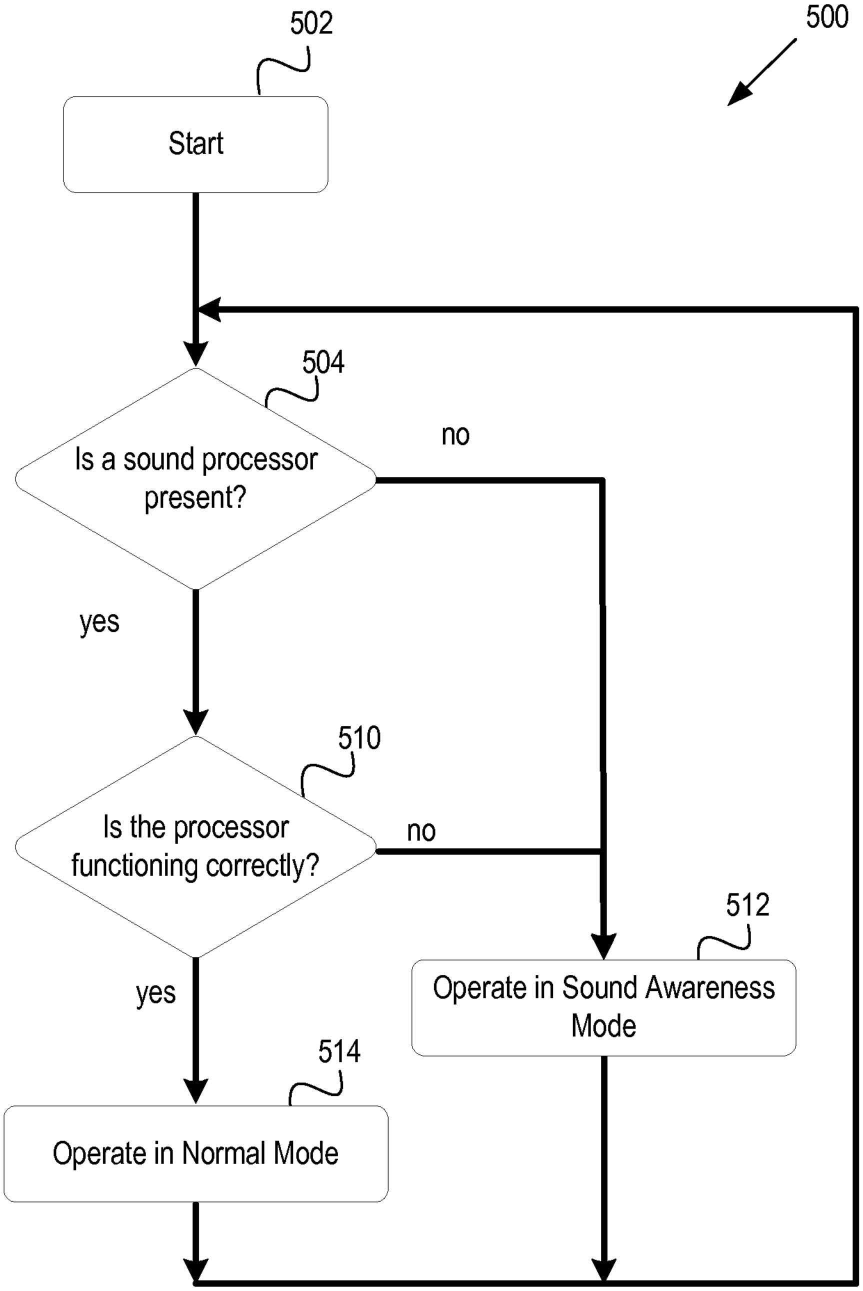
FIG. 5 is a flow diagram of one embodiment of an algorithm for use with the sound awareness system.

FIG. 5 is a flow diagram of one embodiment of an algorithm for use with the sound awareness system presented herein. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

The algorithm 500 may start at block 502. At block 504 a determination is made as to whether a sound processor is present as part of the hearing prosthesis. The sound processor may be housed in the external portion of a cochlear implant hearing prosthesis. The external portion of a cochlear implant hearing prosthesis may also have a primary transducer. In some embodiments, the primary transducer may be present, but the signal processing device may not be present. If the sound processor is present, the algorithm may proceed to block 510.

The sensor used to determine the presence of the external portion of the hearing prosthesis may be similar the sensor described above. The sensor may vary depending on the hardware of the internal portion of the hearing prosthesis. In some embodiments, there may be more than one sensor. In other embodiments, there may only be one sensor. For example, the internal portion may have a magnetic sensor. The magnetic sensor detects the presence of a magnet in the external portion when the external portion is placed adjacent to a patient's head.

Additional embodiments may have a sensor that detects a signal that is transmitted from the external portion to the internal portion. In some embodiments, the detected signal is a "keep alive" signal the external portion sends to the internal portion. The "keep alive" signal is used to communicate the status of the hearing prosthesis. For example, during operation of the hearing prosthesis, a "keep alive" signal is transmitted to ensure the internal portion stays powered on. If no "keep alive" is received for a predetermined period of time, the internal portion may go in to sound awareness mode. In other embodiments, the sensor may sense a signal from the external portion that contains acoustic information. If no signal with audio data is received for a predetermined period of time, the internal portion may go in to sound awareness mode.

At block 510, a determination is made as to whether the sound processor is functioning correctly. In some embodiments, the sound processor may contain instructions to perform a self-test. In other embodiments, the hearing prosthesis may be able to determine when the processor may be malfunctioning. Additionally, the block 510 may determine if the external processing unit is correctly coupled to the internal processing unit. If the sound processor is not functioning correctly, the algorithm may proceed to block 512. If step 510 determines that the processor is functioning correctly, the hearing prosthesis may switch to operate in normal operation mode at block 514. Additionally, as part of block 514, algorithm 500 may continuously repeat steps 504 and 510 to ensure the processor is present and functioning correctly.

The determination may be made in variety of ways. In one embodiment, the external portion 150 may have a self-test mode executed by the sound processor 104. For example, the in the self-test mode, the external portion 150 may be able to emit a sound and sense the emitted sound with the primary transducer 102. If the sound is not sensed by the primary transducer 102, the external portion may not be operating correctly. Additionally, the external portion 150 and the internal portion 175 may have an electronic hand shake when initially coupled. The hand shake may be a signal that confirms each module is functioning correctly.

If it is determined at block 504 that the sound processor is not present, then the algorithm may advance to block 512. Similarly, if it is determined at block 510 that the sound processor is not functioning correctly, then the algorithm may advance to block 512. At block 512, the hearing prosthesis may switch to operate in sound awareness mode, wherein the prosthesis may execute a method similar to method 500. The method may detect a signal associated with an acoustic signal with an acoustic detector. The amplitude of a signal detected with the acoustic detector may be compared with a threshold detection level value. If the amplitude of a signal detected with the acoustic detector meets or exceeds the threshold detection level value, then an alert signal may be generated.

Block 512 can also be a more intelligent block that is not purely based on the threshold detection level value, but on the whole signature of the detected sound. This signature may include components of the sound such as modulation index, frequency patterns, signal to noise estimations, etc. Thus, Block 512 may detect an aspect of a received signal and compare the aspect to a threshold specific for each respective aspect. The disclosure focuses on threshold detection, however other aspects of the received signal may be used to trigger sound awareness mode as well.

In some embodiments, blocks 504 and 510 may be performed in parallel to block 512. For example, if a hearing prosthesis is operating in the sound awareness mode, and an external unit of the hearing prosthesis is coupled to the prosthesis, the prosthesis may return to a normal operation mode.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A medical implant configured to operate in a primary mode and a secondary mode, the medical implant comprising:

an implantable detector configured to be implanted in a recipient of the medical implant and configured to detect sound;

a processor configured to be implanted in the recipient and configured to detect a presence of one or more signatures within the sound; and output circuitry configured to be implanted in the recipient and configured to electrically stimulate the recipient, wherein, when the medical implant is in the secondary mode, the output circuitry is configured to deliver one or more electrical stimulation signals to the recipient in response to the sound only when at least one of the one or more signatures is detected in the sound, and wherein one or more attributes of the one or more electrical stimulation signals are set based on the at least one signature of the one or more signatures detected in the sound.

2. The medical implant of claim 1, wherein the medical implant operates with an external portion configured for operation outside of the body of the recipient, and wherein the external portion comprises a primary sound processor and a primary detector.

3. The medical implant of claim 2, wherein at least one of the primary detector or the implantable detector is at least one of a microphone, an accelerometer, or a vibration detector.

4. The medical implant of claim 2, wherein the one or more electrical stimulation signals are based on an input signal received from the primary sound processor, wherein the input signal is based on sound detected by the primary detector.

5. The medical implant of claim 4, wherein the implantable detector does not contribute to the one or more electrical stimulation signals.

6. The medical implant of claim 2, further comprising:

detection circuitry configured to determine whether the output circuitry is receiving an input signal from the primary sound processor, wherein the medical implant operates in the secondary mode when the output circuitry is not receiving an input signal from the primary sound processor.

7. The medical implant of claim 6, wherein the output circuitry does not receive the input signal from the primary sound processor when the external portion is disconnected from the body of the recipient.

8. The medical implant of claim 6, wherein the output circuitry does not receive the input signal from the primary sound processor when the primary sound processor is malfunctioning.

9. The medical implant of claim 6, wherein when the input signal is not being received from the primary sound processor of the external portion associated with the medical implant, the output circuitry is configured to deliver the one or more electrical stimulation signals based on the sound detected by the implantable detector.

10. The medical implant of claim 1, further comprising:

a battery configured to be implanted in the recipient of the medical implant and configured to power the implantable detector and the processor.

11. The medical implant of claim 1, wherein the implantable detector is configured to:

detect a presence of sounds from within the recipient; and generate a representation of the sounds detected from within the recipient.

12. The medical implant of claim 11, wherein the sounds detected from within the recipient include sounds generated by the recipient or sounds produced within the body of the recipient.

13. The medical implant of claim 11, wherein the implantable detector is configured to detect the presence of the sounds from within the recipient by detecting vibrations that represent the sounds.

14. The medical implant of claim 11, wherein the implantable detector is configured to:

generate an indication that at least one aspect of the sounds detected from within the recipient is above at least one threshold level.

15. The medical implant of claim 14, wherein the medical implant is configured to stimulate the recipient with an alert signal when the at least one aspect of the sounds detected from within the recipient exceeds the at least one threshold level.

16. The medical implant of claim 15, wherein the alert signal is at least one of a mechanical vibration signal, an electrical stimulation signal, or an audio signal.

17. The medical implant of claim 15, wherein the at least one aspect of the sounds detected from within the recipient includes one or more of an amplitude, a modulation index, a frequency pattern, or a signal-to-noise estimation associated with the signature detected within the sound, wherein the at least one threshold level includes one or more threshold levels that are specific to each of the amplitude, the modulation index, the frequency pattern, and the signal-to-noise estimation, respectively.

18. A method comprising:

detecting sound via an implantable detector configured to be implanted in a recipient of a medical implant, wherein the medical implant is configured to operate in a primary mode and a secondary mode;

detecting whether one or more signatures is present within the sound via a processor implanted in the recipient; and when the medical implant operates in the secondary mode, delivering, via output circuitry of the medical implant, electrical stimulation signals to the recipient in response to the sound only when at least one of the one or more signatures is detected in the sound, and wherein one or more attributes of the electrical stimulation signals are set based on the at least one of the one or more signatures is detected in the sound.

19. The method of claim 18, wherein the electrical stimulation signals are based on an input signal received from a primary sound processor of an external portion of the medical implant that is configured for operation outside of the body of the recipient, wherein the input signal is based on sound detected by a primary detector of the external portion.

20. The method of claim 19, wherein the implantable detector does not contribute to the electrical stimulation signals.

21. The method of claim 18, further comprising:

determining, via detection circuitry of the medical implant, whether the output circuitry is receiving an input signal from a primary sound processor of an external portion of the medical implant that is configured for operation outside of the body of the recipient, wherein the medical implant operates in the secondary mode when the output circuitry is not receiving an input signal from the primary sound processor.

22. The method of claim 21, wherein the output circuitry does not receive the input signal from the primary sound processor when the external portion is disconnected from the body of the recipient.

23. The method of claim 21, wherein the output circuitry does not receive the input signal from the primary sound processor when the primary sound processor is malfunctioning.

24. The method of claim 22, further comprising:

creating the electrical stimulation signals based on a sound detected by the implantable detector implanted in the recipient when the input signal is not being received from the primary sound processor of the external portion associated with the medical implant.

25. The method of claim 18, further comprising:

detecting a presence of sounds from within the recipient via the implantable detector; and generating a representation of the sounds detected from within the recipient via the implantable detector.

26. The method of claim 25, wherein the sounds detected from within the recipient include sounds generated by the recipient or sounds produced within the body of the recipient.

27. The method of claim 25, wherein detecting the presence of the sounds from within the recipient comprises detecting vibrations that represent the sounds via the implantable detector.

28. The method of claim 25, further comprising:

generating an indication that at least one aspect of the sounds detected from within the recipient is above at least one threshold level via the implantable detector.

29. The method of claim 28, further comprising:

stimulating the recipient with an alert signal via the medical implant when the at least one aspect of the sounds detected from within the recipient exceeds the at least one threshold level, wherein the alert signal is at least one of a mechanical vibration signal, an electrical stimulation signal, or an audio signal.

30. The method of claim 29, wherein the at least one aspect of the sounds detected from within the recipient includes one or more of an amplitude, a modulation index, a frequency pattern, or a signal-to-noise estimation associated with the signature detected within the sound, wherein the at least one threshold level includes one or more threshold levels that are specific to each of the amplitude, the modulation index, the frequency pattern, and the signal-to-noise estimation, respectively.

* * * * *